(12) United States Patent
Pul

(10) Patent No.: US 9,572,352 B2
(45) Date of Patent: Feb. 21, 2017

(54) FILLED DOUGH PRODUCING METHOD

(71) Applicant: George Pul, Las Vegas, NV (US)

(72) Inventor: George Pul, Las Vegas, NV (US)

( * ) Notice: Subject to any disclaimer, the term of this patent is extended or adjusted under 35 U.S.C. 154(b) by 0 days.

(21) Appl. No.: 14/550,910

(22) Filed: Nov. 21, 2014

(65) Prior Publication Data

US 2015/0147446 A1    May 28, 2015

Related U.S. Application Data

(60) Provisional application No. 61/909,203, filed on Nov. 26, 2013.

(51) Int. Cl.
*A21C 9/06* (2006.01)

(52) U.S. Cl.
CPC .................... *A21C 9/063* (2013.01)

(58) Field of Classification Search
CPC ...................................... A21C 9/063
USPC ................... 426/283, 284, 390, 391
See application file for complete search history.

(56) References Cited

U.S. PATENT DOCUMENTS

| | | | | |
|---|---|---|---|---|
| 1,409,463 A * | 3/1922 | O'Brien | .................. | A21C 9/061 425/111 |
| 2,157,656 A * | 5/1939 | Doble | .................. | B65D 85/808 426/77 |
| 2,691,998 A * | 10/1954 | Stucker | ..................... | A45C 3/06 150/118 |
| 3,847,194 A * | 11/1974 | Corigliano | ........... | A45C 7/0077 150/103 |
| 5,405,256 A * | 4/1995 | Dalton | .................... | A21C 9/063 425/112 |
| 5,771,787 A * | 6/1998 | Hirano | ...................... | A21B 3/13 249/DIG. 1 |
| 6,203,830 B1 * | 3/2001 | Cademartiri | ........... | A21C 9/063 426/275 |
| 6,578,471 B2 * | 6/2003 | Graham | ................... | A21B 5/08 425/405.1 |
| 8,469,066 B2 * | 6/2013 | Castillo | .................... | B67C 11/02 141/338 |
| 2005/0056643 A1 * | 3/2005 | Hagan | .................. | A45C 7/0077 220/9.3 |
| 2006/0215939 A1 * | 9/2006 | Watkins | ................ | B01F 13/002 383/4 |

* cited by examiner

*Primary Examiner* — Kevin R Kruer

(57) ABSTRACT

Filled dough producing method is disclosed for making a food product, such as baozi, a traditional Chinese food, by folding and constricting close a circular dough wrapper around a filling in an apparatus including a pocket assembly made of pliable fabric layer with an upper surface and lower surface, a flexible frustro-conical member connected to the lower surface of the pliable fabric layer, and draw strings for making a pouch, wherein the frustro-conical member is configured to be alternately inverted from a first rigid position to a second rigid position.

4 Claims, 4 Drawing Sheets

FILLED DOUGH PRODUCING METHOD

BACKGROUND OF THE INVENTION

Baozi is a traditional Chinese food made by folding a flat and circular yeast leavened dough sheet, a dough wrapper, around its filling, and is often steam cooked. The resulting baozi is ball shaped, has many folds at its upper body around the dough wrapper closure, and is smooth at the lower body.

Making a baozi traditionally by hand has been very much like making a handcraft that is time-consuming and requires a relatively high degree of both skill and labor. What is needed in the art is baozi producing method suitable for the everyday consumers.

SUMMARY OF THE INVENTION

The invention is generally directed to a filled dough producing method which, among other things, greatly reduces both the skill and labor required to make a quality baozi.

Filled dough producing method of the present invention employs the use of a filled dough producing apparatus, comprising: a pliable fabric layer with an upper surface and lower surface; and a flexible frustro-conical member defining a radially inner periphery and a radially outer periphery, the frustro-conical member being connected along the radially inner periphery thereof to the lower surface of the pliable fabric layer, wherein the frustro-conical member is corrugated and configured to be alternately inverted or reversed from a first rigid position in which the radially inner periphery is on a first side and a second rigid position in which the radially inner periphery is on a second side opposing the first side. The invention of filled dough producing method may further include means for causing the radially inward movement of the filled dough producing apparatus, and means for causing the frustro-conical member to move from the first rigid position to the second rigid position.

In some apparatus for filled dough producing method, the means for causing the radially inward movement of the filled dough producing apparatus comprises the additions of one or more drawstrings connected with the frustro-conical member.

In some apparatus of filled dough producing method, the means for causing the frustro-conical member to move from the first rigid position to the second rigid position comprises an inner tubular member having a diameter corresponding to the inner periphery of the frustro-conical member and an outer tubular member including an outer radial rim, the outer tubular member having a diameter which is greater than the diameter of the inner tubular member, wherein the outer tubular member is operatively associated with the inner tubular member and configured for lateral movement axially along the exterior of the inner tubular member.

In summary, the present invention of filled dough producing method for a filled dough product by drawstrings is similar to a common drawstring pouch comprising the steps described below. A circular dough wrapper with its filling on top is placed on the apparatus pocket assembly in open position before drawstrings are pulled. The dough wrapper is then securely sandwiched in between the apparatus folds through its corrugated edge stiffener and folded close by the folding of the apparatus in close position. The folded dough wrapper enclosing its filling is further constricted to close to form a filled dough piece within the apparatus pouch after drawstrings are pulled. The completed filled dough is released from the apparatus when the drawstrings are released and the folding assembly is opened.

DESCRIPTION OF THE PREFERRED EMBODIMENT

Apparatus used in the invention for filled dough producing method fold and close a dough wrapper around its filling in producing a filled dough piece facilitated by the creation of a pouch around the dough wrapper by using the apparatus described herein. An apparatus used in the invention for filled dough producing method will now be described with reference to the drawings.

Unless otherwise apparent, or stated, directional references, such as "inner," "inward," "outer," "outward," "downward," "upper", "lower" etc., are for non-limiting descriptive purposes and intended to be relative to the orientation of a particular apparatus for filled dough producing method of the invention as shown in the view of that apparatus.

Referring to FIGS. 1-5, a filled dough producing apparatus 1 used by filled dough producing method is shown in perspective view in the open position. Apparatus 1 comprises a folding assembly 2, a tubular guide chute 6, and a flanged pipe slider 7 having a greater diameter than the diameter of guide chute 6. Folding assembly 2 is mounted on and supported by guide chute 6, while flanged tube slider 7 is capable of lateral movement along the exterior surface of guide chute 6.

Figure 1:
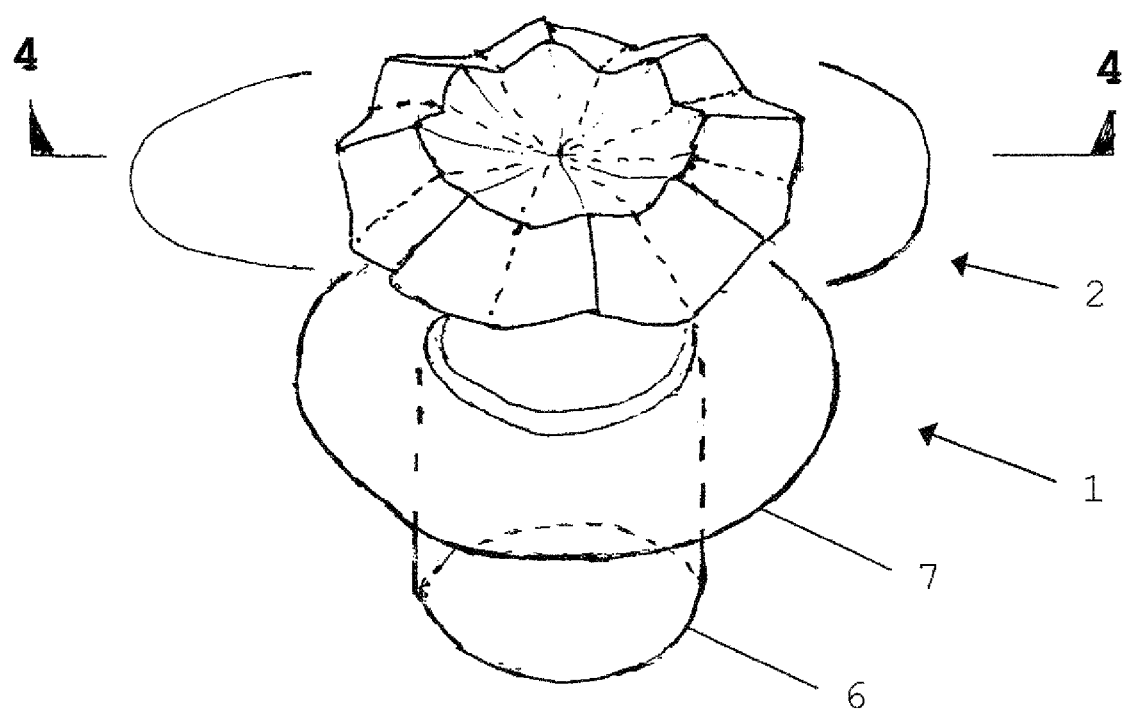
FIG. 1 is a perspective view of an apparatus used by filled dough producing method of the invention in an open or receiving position.
Figure 2:
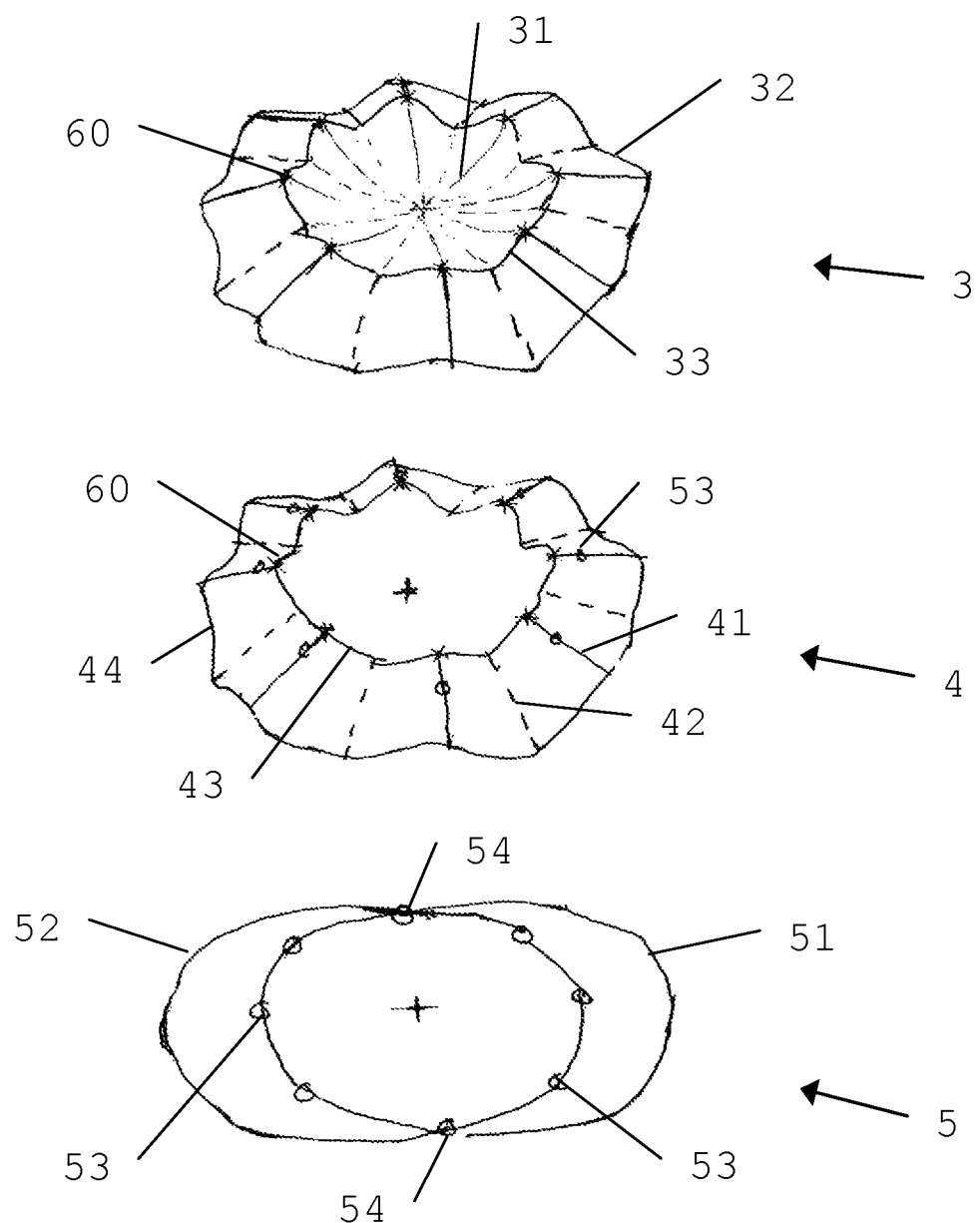
FIG. 2 is an exploded view of the folding assembly of the apparatus for filled dough producing method shown in FIG. 1.

As shown particularly in FIG. 2, folding assembly 2 of this apparatus for filled dough producing method comprises a pocket assembly layer 3, a corrugated edge stiffener 4, and a device for causing the pocket assembly layer to move radially inward which in this apparatus for filled dough producing method includes drawstring assembly 5. Pocket assembly layer 3 is preferably made of a thin, lightweight and pliable material, such as a fabric. Pocket assembly layer 3 may be generally circular in shape and include a circular pocket 31 defined centrally within a surrounding radially outer border area or skirt 32 and facilitated by corrugated edge stiffener 4 as discussed herein. Corrugated edge stiffener 4 is a generally frustro-conical shaped member defining a radially inner periphery and a radially outer periphery. The corrugated edge stiffener 4 may be made of a resilient yet flexible material and includes alternating ridges and grooves to facilitate being reversed, that is, turned inside out, that is, alternately changed from a first rigid position in which the inner periphery edge 43 and outer periphery edge 44 are in a first, open or receiving configuration to a second rigid position in which the inner periphery edge 43 and outer periphery edge 44 are in a second or closed configuration that is the inverse of the first configuration. In other words, the inner and outer periphery edges 43 and 44 of stiffener 4 may be alternately folded downward and folded upward so that the inner and outer periphery may be positioned either with one up and the other down relative to one another. In this apparatus for filled dough producing method, there are eight symmetrical radial folding-lines identified by reference numerals 41 and 42, respectively, to illustrate the alternating radial ridges and grooves of stiffener 4. The radial ridges and grooves of corrugated edge stiffener 4 can be used to control the number and size of folds on a baozi dough wrapper 8 placed on the upper surface of layer 3.

The upper surface of corrugated edge stiffener 4 and lower surface of pocket assembly layer 3 are connected with one another along the radially inner peripheral edge 43 of stiffener 4, thus defining a circular filled dough receiving pocket 31 having an outer circumference 33 corresponding to the radially inner peripheral edge 43 of stiffener 4. In this apparatus for filled dough producing method, corrugated edge stiffener 4 may be connected to the lower surface of pocket assembly 3 by any conventional means, such as adhesive. As shown in FIG. 2, stiffener 4 and assembly layer 3 are connected at locations 60 which are equally spaced from one another along the radially inner peripheral edge 43 of stiffener 4. The eight connection points 60 also correspond with the eight radial ridges identified as folding lines 41 shown on stiffener 4.

The drawstring assembly 5 consists of two drawstring loops, 51 and 52, which are threaded through eight tie-down beads 53 positioned in a circular formation between the inner radial edge and outer radial edge of stiffener 4. In this apparatus for filled dough producing method, beads 53 are positioned along alternating ridge 41 at a radially outer position with respect to each of the connection points 60, and may be generally adjacent to the radial midpoint between inner and outer peripheral edges 43 and 44 of stiffener 4. Beads 53 include two diametrically opposed junction beads 54 for providing a common point for the two drawstrings loops 51 and 52. The drawstring assembly 5 is mounted between the upper surface of corrugated edge stiffener 4 and lower surface of pocket assembly layer 3. In other apparatus for filled dough producing method, there may be multiple sets of drawstrings and/or additional beads 53 positioned at various radial points along ridge 41 to form a lattice-type structure. In other apparatus for filled dough producing method, a belt or similar force applying and releasing the apparatus other than a drawstring may be employed to cause the radially inward movement of stiffener 4 and the radial outer circumference 33 of pocket 31, and allow for the radially outward return of stiffener 4.

Figure 3:
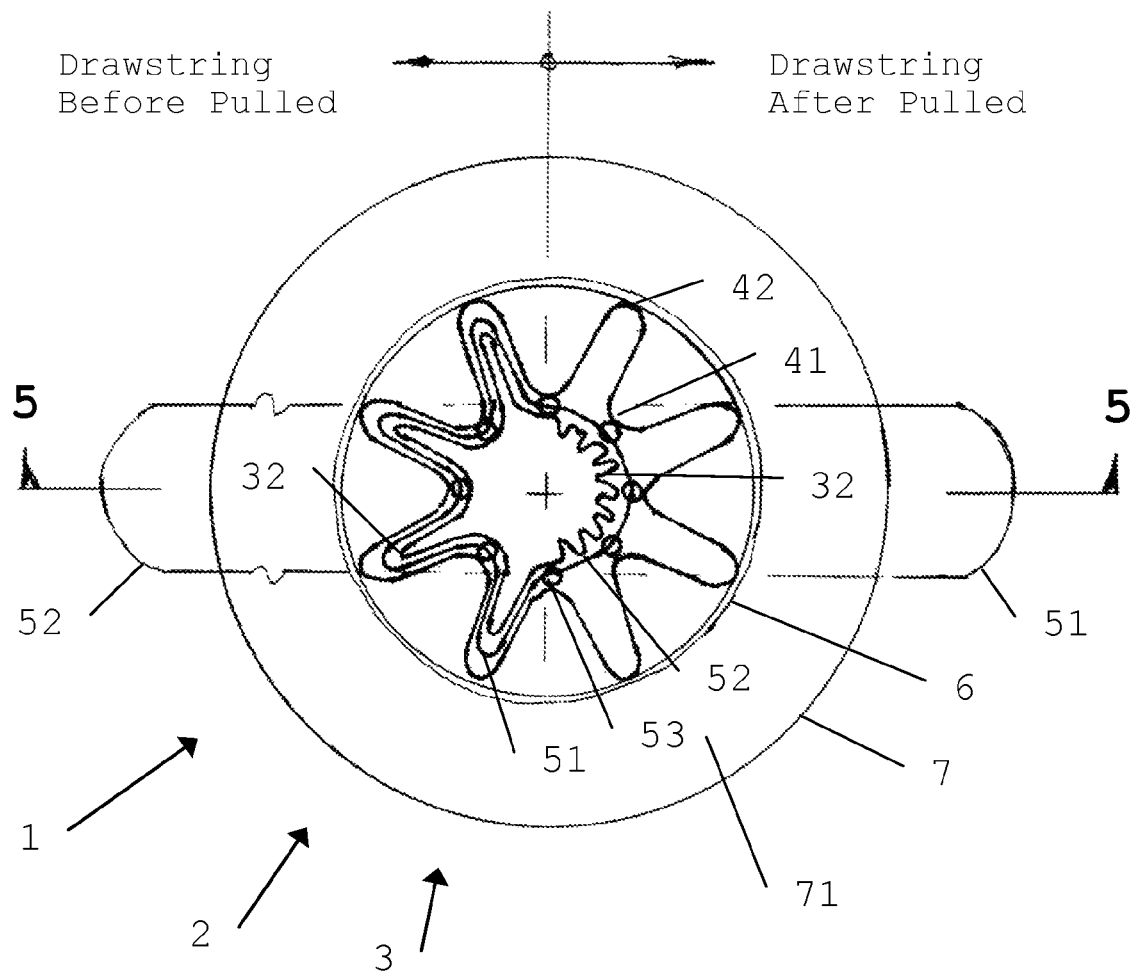
FIG. 3 is a top view of the apparatus for filled dough producing method shown in FIG. 1 in the closed position.
Figure 4:
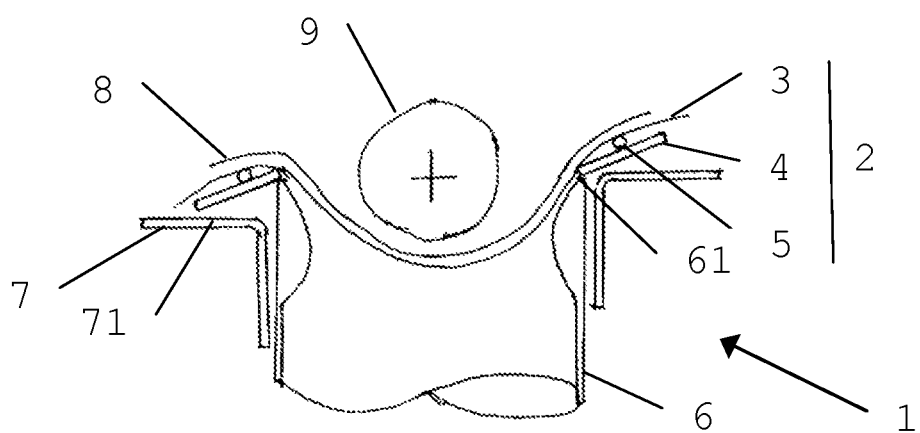
FIG. 4 is a cross section view of the apparatus for filled dough producing method shown in FIG. 1 taken along line 4-4 of FIG. 1, illustrating a baozi dough wrapper and its filling placed in the receiving pocket of the apparatus.

Referring to FIG. 3 where apparatus 1 for filled dough producing method is shown in plan view fully folded in the closed position with the outer circumference 33 of pocket 31 being forced radially inward to substantially and generally enclose pocket 31. As shown in FIG. 4 of this apparatus for filled dough producing method, folding assembly 2 is supported by guide chute 6 having a substantially tubular shape. One end of guide chute 6 has an opening at one end 61 with a diameter corresponding to and in contact with the lower surface of the inner peripheral edge 43 of stiffener 4. While in contact with the lower surface of inner peripheral edge 43, pocket 31 extends or hangs axially within guide chute 6. In some apparatus for filled dough producing method, guide chute 6 may also have an integral opening reducer at end 61.

A flanged tubular slider 7 having radially outer rim 71 is configured and dimensioned for lateral movement along the outer surface of guide chute 6 so that rim 71 may be brought into contact with the lower surface of stiffener 4 and facilitate switching stiffener 4 from the first position to the second position. In other apparatus for filled dough producing method, the force to cause stiffener to alternative from the first position or open configuration to the second position or closed configuration may be provided by other apparatus for filled dough producing method, such as radially outward extending arms connected to the stiffener 4.

In operation, a baozi dough wrapper 8 and its filling 9 are placed on the assembly 3 of apparatus 1 for filled dough producing method with the stiffener 4 in the first position or open configuration, that is, with inner peripheral edge 43 of stiffener 4 being axially above the outer peripheral edge 44 with respect to guide chute 6.

The dough wrapper 8 may be powdered on its underside where it is in contact with the pocket assembly layer 3 to facilitate the release and removal of the completed filled dough piece from contact with the upper surface of layer 3. The dough wrapper 8 may be un-powdered on the side which contacts filling 9 and will be closed upon itself in order to facilitate adhesion and closure of the dough wrapper 8 when folded together by the corrugated edge stiffener 4, and constricted close by the pulling of drawstrings.

As forces including the weight of the baozi dough wrapper 8 and its filling 9 in pocket assembly 3 cause pocket assembly 3 to be ready to move laterally downward, the flanged tube slider 7 is moved laterally upward axially along the chute 6 in the opposing direction, causing rim 71 to contact the lower surface of the corrugated edge stiffener 4 and force stiffener 4 into the second position or closed configuration. In the second position, inner peripheral edge 43 of stiffener 4 is axially below the outer peripheral edge 44 with respect to guide chute 6, causing pocket assembly 3 with baozi dough wrapper 8 and filling 9 therein to move axially down into the interior of chute 6.

Figure 5:
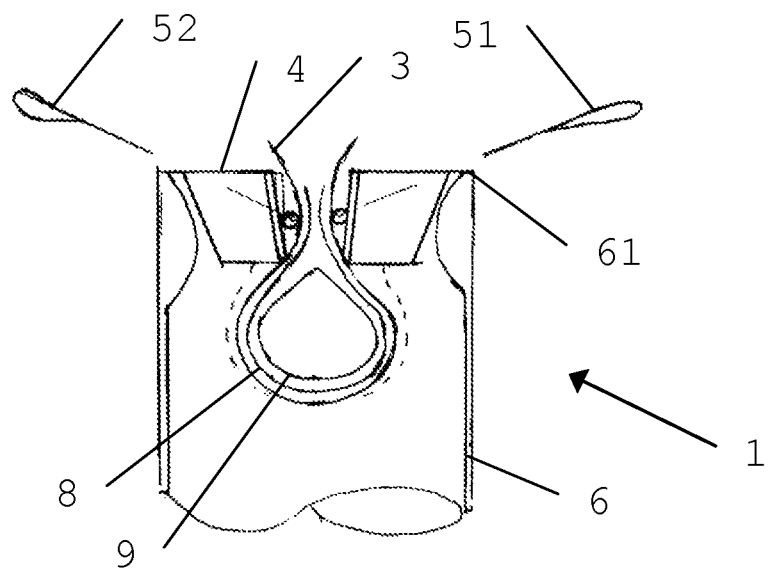
FIG. 5 is cross section view of the apparatus for filled dough producing method shown in FIG. 1 taken along line 5-5 in FIG. 3, illustrating, among other things, the receiving pocket being constructed by pulling the drawstrings.

Before drawstrings 51 and 52 are pulled, it should be noted that in this apparatus for filled dough producing method, pocket assembly skirt 32 as well as baozi dough wrapper 8 are sandwiched in between the folds of the corrugated edge stiffener 4. As drawstring loop 51 and 52 are pulled, pocket assembly skirt 32 with baozi dough wrapper 8 are constricted to move inwardly and be completely pulled out from the folds of the corrugated edge stiffener 4. The pocket assembly 3 is constricted close to form a pouch while portions of the baozi wrapper 8 are brought together around filling 9 thus forming a completed baozi as shown in FIG. 5. Guide chute 6, provides support for folding assembly 2 in the open configuration. Guide chute 6 also guides and promotes the folding action of folding assembly 2 via stiffener 4 moving from the first position to the second position as the weight of a wrapper 8 and filling 9 applies force to folding assembly 2 down chute 6. Chute 6 surrounds and supports the folding assembly 2 when in the closed configuration. Flanged tube slider 7, as it moves up and down the guide chute 6, provides means to snap over the folding assembly 2 from the first position to the second position. Continuing lifting of the folding assembly 2 with the completed baozi within, out and away from the confining guide chute 6, allows for the unfolding and opening of the folding assembly 2 and removal of the completed baozi.

As discussed herein, in some apparatus for filled dough producing method of the invention includes a folding assembly made of a soft and pliable circular pocket assembly, a flexible corrugated edge stiffener attached to the pocket assembly, draw strings looped around and attached to the corrugated edge stiffener. In some apparatus for filled dough producing method, the apparatus is also provided with a guide chute that provides support, folding guide, and confinement of the folding assembly. Pulling the drawstrings constricts the folded pocket assembly and turning it into a ball shaped pouch. The drawstrings are then used to lift and remove the folding assembly from the guide chute. Releasing the drawstrings allow for the unfolding and opening of the folding assembly.

Thus the present invention of filled dough producing method may be employed in producing a filled dough piece like a traditional Chinese baozi. The method thus includes a circular yeast leavened dough wrapper with its filling on top being placed on the apparatus prior to folding the corrugated edge stiffener and before drawstrings are pulled. The dough wrapper folds and encloses its filling within the folded pocket assembly after the corrugated edge stiffener is folded and confined inside the guide chute. The folded dough wrapper with its enclosed filling is constricted to close as the folded pocket assembly is constricted to close into a pouch. After lifting and removing the folding assembly containing the completed baozi from the guide chute, releasing the drawstrings unfold and opens the apparatus folding assembly and releases the completed baozi. The apparatus may then be ready for a new dough wrapper and its filling to make the next baozi.

The apparatus for filled dough producing method includes features for holding open the folding assembly, inverting the corrugated edge stiffener between its two stable orientations, and to initiate folding operation. The corrugated edge stiffener defines the pouch major fold lines, and as the corrugated edge stiffener is folded, it also acts to hold the dough wrapper in place while folding it. The apparatus used for filled dough producing method of the invention may be in the open position for placing a dough wrapper with its filling on the apparatus, or transitioning into the close position for folding the dough wrapper around its filling, or in the final closed position with the drawstrings pulled and the dough wrapper is fully folded and constricted close around its filling to produce a completed filled dough piece.

Filled dough producing method described above are for the purpose of describing features and technical conceptions of the method of the present invention, but it should be readily apparent that the invention is not limited to the described filled dough producing method alone. A person skilled in the art may come up with various changes and modifications consistent to the technical concept disclosed herein and within the spirit and scope of the invention. Therefore, it is to be understood that modifications and variations may be utilized without departure from the spirit and scope of the invention disclosed herein, as those skilled in the art will readily understand. Such modifications and variations are considered to be within the purview and scope of the claimed invention and their equivalents.

I claim:

1. A method of producing a filled dough product comprising:
    mounting and supporting a folding assembly on top of a tubular guide chute,
    wherein said folding assembly comprises a pocket assembly layer and a frustro-conical shaped corrugated edge stiffener having a radially inner periphery and a radially outer periphery; said radially inner periphery corresponding to the diameter of said tubular guide chute; said corrugated edge stiffener is connected to the lower surface of said pocket assembly layer along the edge of said radially inner periphery such that said pocket assembly is centrally located within said corrugated edge stiffener; and wherein said folding assembly further comprises at least two drawstrings threaded in a circular formation between said inner and outer peripheries of said corrugated edge stiffener;
    said folding assembly is mounted on said tubular guide chute such that said edge of said radially inner periphery is axially above the edge of said radially outer periphery relative to said tubular guide chute,
    placing a circular dough wrapper on said folding assembly;
    placing a filing on said circular dough wrapper;
    moving said circular dough wrapper laterally downward into the interior of the chute;
    re-positioning said folding assembly such that said edge of said radially inner periphery is axially below said edge of said radially outer periphery with respect to said tubular guide chute;
    pulling said drawstrings to further enclose said filling in said circular dough wrapper to form a filled dough wrapper;
    lifting said folding assembly containing said filled dough wrapper away from the guide chute;
    and releasing said filled dough wrapper from said folding assembly by releasing the drawstrings and allowing said folding assembly to open.

2. The method of producing a filled dough product of claim 1 wherein the number and size of folds in said filled dough wrapper are controlled by the number and size of the radial ridges and grooves of said corrugated edge stiffener.

3. The method of producing a filled dough product of claim 1 wherein said tubular guide chute further comprises an outer tubular member having a diameter which is greater than the diameter of said tubular guide chute and wherein the outer tubular member is operatively associated with said tubular guide chute and configured to laterally move axially long the exterior of the tubular guide chute so as to re-position said folding assembly such that said edge of said radially inner periphery is axially below said edge of said radially outer periphery with respect to said tubular guide chute.

4. The method of producing a filled dough product of claim 1 wherein said folding assembly comprises multiple sets of drawstrings positioned at various radial points.

* * * * *